W. A. CRAGIN.
SCALE.
APPLICATION FILED SEPT. 19, 1913.
1,114,121.
Patented Oct. 20, 1914.
2 SHEETS—SHEET 2.
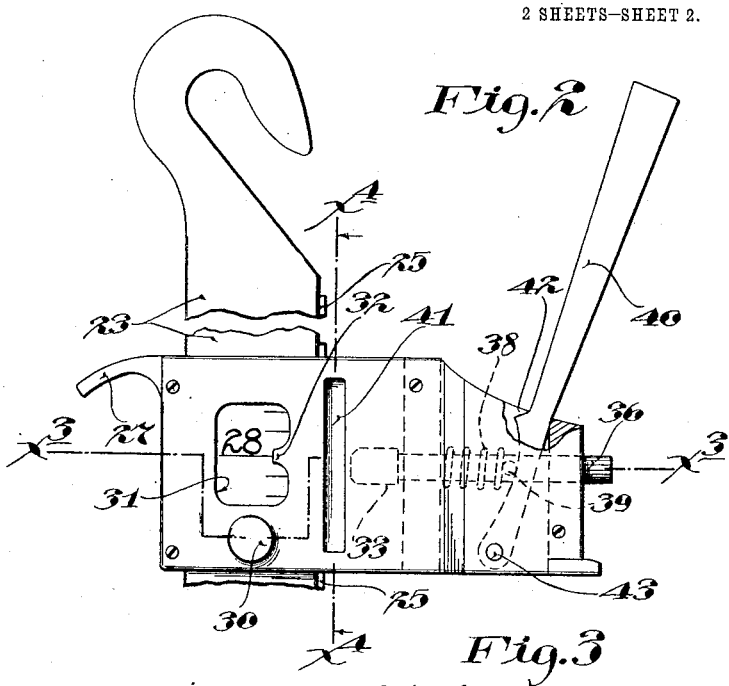
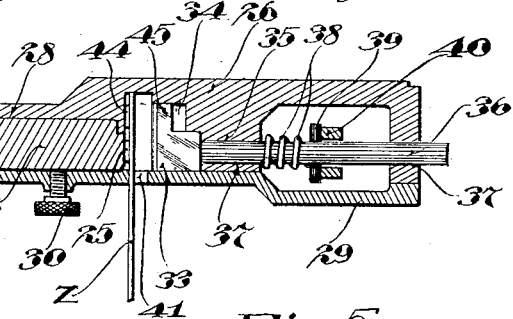
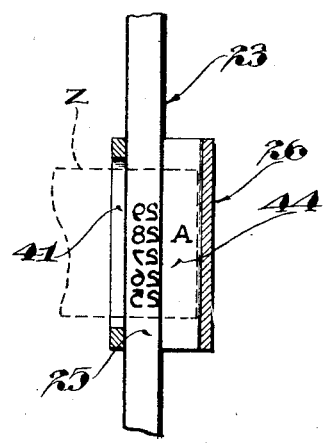
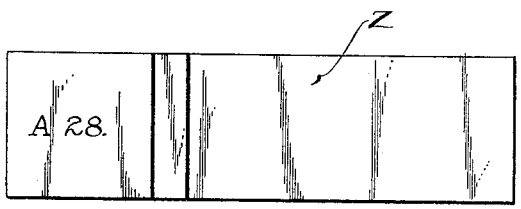
Witnesses
E. C. Skinkle
A. H. Opsahl
Inventor
Walter A. Cragin
By his Attorneys
Williamson Merchant

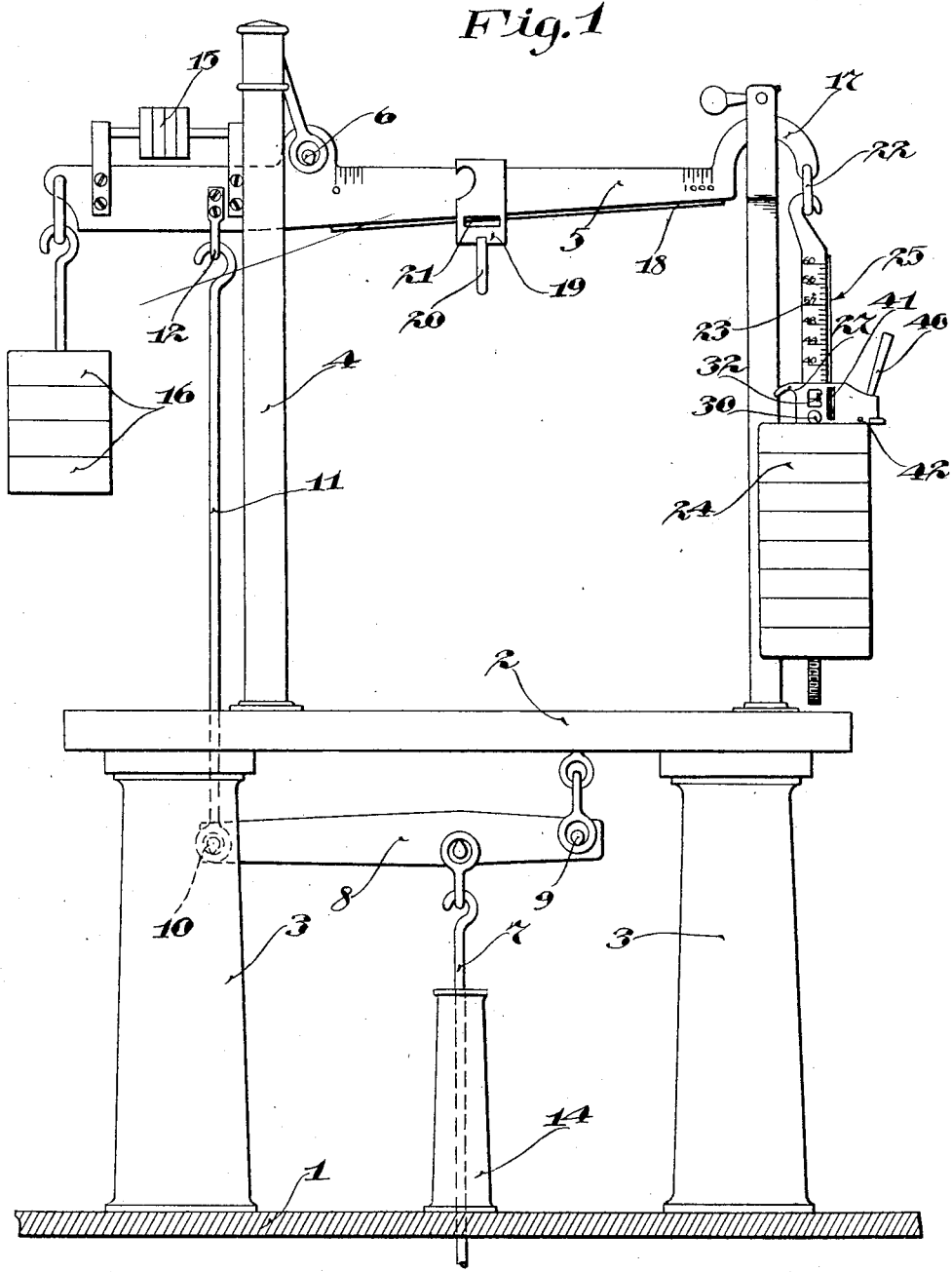

UNITED STATES PATENT OFFICE.

WALTER A. CRAGIN, OF WINIFRED, MONTANA.

SCALE.

1,114,121.  Specification of Letters Patent.  Patented Oct. 20, 1914.

Application filed September 19, 1913. Serial No. 790,789.

*To all whom it may concern:*

Be it known that I, WALTER A. CRAGIN, a citizen of the United States, residing at Winifred, in the county of Fergus and State of Montana, have invented certain new and useful Improvements in Scales; and I do hereby declare the following to be a full, clear, and exact description of the invention, such as will enable others skilled in the art to which it appertains to make and use the same.

My invention relates to improvements in scales, especially hopper scales for weighing grain in car lots and having type registering beams. In scales of this character, the weight of the load is stamped on a ticket, first by inserting the same in a slot in a traveling indicator carried by the counterpoise and there taking a first impression, and thereafter inserting the same in a slot in the beam poise and there taking a second impression. The two impressions, read together, give the weight of the load. It often happens that the capacity of a car is greater than the capacity of the scale hopper, therefore necessitating the weighing of the load in two drafts, in which case the weight of each draft must be stamped on the ticket and the two added together, to give the total weight of the grain in the car. Elevators and mills usually have two or more scales of this character, and it is often highly important to know on which scale a load has been weighed, especially in case two drafts are taken.

The object of my invention is to provide means for printing on the ticket the identification of the scale at the time the weight is printed thereon, preferably at the time of the first impression.

To the above end, the invention consists of the novel devices and combinations of devices hereinafter described and defined in the claims.

In the accompanying drawings, which illustrate the invention, like characters indicate like parts throughout the several views.

Referring to the drawings, Figure 1 is a side elevation of a scale having the invention incorporated therein; Fig. 2 is a detail view, on an enlarged scale, of the counterpoise stem and traveling indicator head mounted thereon, some parts being broken away; Fig. 3 is a view principally in longitudinal, horizontal section, taken on the line $x^3$ $x^3$ of Fig. 2; Fig. 4 is a transverse vertical section, taken on the line $x^4$ $x^4$ of Fig. 2; and Fig. 5 is a plan view of one of the tickets having printed thereon the scale identification and the weight of the load.

The numeral 1 indicates the floor of a building on which is mounted a scale having my invention incorporated therein. Of the parts of the scale, the numeral 2 indicates a shelf supported above the floor 1 by a pair of heavy pedestals 3. Secured on the shelf 2 is a standard 4, to which the scale beam 5, of the type registering form, is intermediately fulcrumed at 6. The short end of the beam 5 is connected to the steelyard rod 7 by an equalizing lever 8 fulcrumed, at its short end, to a depending bearing 9 on the shelf 2 and having its long end fulcrumed at 10 to the beam rod 11 suspended from an eye 12 attached to the short end of the beam 5. The steelyard rod 7 is fulcrumed at 13 to the equalizing lever 8 and works through a guide 14 secured to the floor 1. The steelyard rod 7 is connected to a hopper, not shown, in the customary manner. On the short end of the scale beam 5 is a balance ball 15 and counterpoise 16 mounted in the customary manner, for securing the balance of the scale. The long end of the beam 5 terminates in a gooseneck 17 and is graduated from zero to one thousand pounds. On the lower longitudinal edge of the beam 5 are type numerals 18 corresponding in denominations to the graduations marked on said beam. Slidably mounted on the beam 5 is a poise 19 having mounted therein a movable platen, only the operating lever 20 of which is shown. This platen coöperates with the type 18, for printing on the ticket 2 the weight indicated by the poise 19, when said ticket is inserted in the slot 21 formed in said poise.

Suspended from the gooseneck 17 by a link 22 is a counterpoise stem 23 in the form of a flat bar graduated from zero to sixty, each graduation indicating a thousand pounds. Counterpoises 24 of one thousand pounds or multiples thereof are placed on the stem 23 for weighing a load exceeding one thousand pounds. On the outer vertical edge of the counterpoise stem 23 are secured type numerals 25 corresponding in denomination to the graduations marked on said stem. Slidably mounted on the stem 23 and loosely resting on the uppermost counterpoise 24 is a hollow traveling indicator head 26 provided with a finger piece 27, by which said head may be raised for the purpose of inserting an additional counterpoise 24 thereunder. The stem 23 works through a vertically extended passage 28 formed in said head 26.

The indicator head 26 is provided with a removable face plate 29, to afford access to the interior of said head and to permit the same to be applied laterally to the stem 23 or removed therefrom. A knurled set screw 30 has screw threaded engagement with the face plate 29 and impinges against the stem 23 for holding the indicator head 26 in set positions. In the face plate 29, directly above the set screw 30, is a sight opening 31, into which projects a pointer 32 integrally formed with the face plate 29 and co-operating with the graduations on the stem 23, to indicate the weight of the load in thousand pounds.

Coöperating with the type 25 is a platen 33 mounted, for movements toward and from the type 25, in a seat 34 formed in a vertically extended rib 35 within the head 26. This platen 33 is provided with a horizontal, rearwardly projecting plunger 36 slidably mounted, for endwise movement, in alined perforations 37 formed in the rib 35 and the rear end wall of the head 26. The platen 33 is normally held in a retracted position by a coiled spring 38 surrounding the plunger 36 and compressed between the rib 35 and a pin 39 passed transversely through the intermediate portion of said plunger 36.

A hand lever 40 is provided for moving the platen 33 onto the type 25, so that, when the ticket z is inserted through the slot 41, in the face plate 29, and between the type 25 and platen 33, the weight indicated by the pointer 32 will be impressed thereon. The rear wall of the head 26 affords a stop for the ticket at the time the same is inserted through the slot 41, so that the weight will always be printed in a predetermined position on said ticket. The lower end of the hand lever 40 is bifurcated and extended through an opening 42 in the top of the head 26 and the prongs thereof straddle the plunger 36, between the rear end of the head 26 and the pin 39, and are fulcrumed to the bottom portion of the head 26 by a pin 43 mounted therein.

The parts thus far described may be of the standard or any desired construction and the operation thereof may be briefly stated as follows: In weighing a load, counterpoises 24 are attached to the stem 23, to equal in amount the thousands of pounds contained in the load which, as shown in the drawing, is 28000 pounds. The beam poise 19 is then moved along the beam 5 until the same balances. One of the tickets z is then inserted through the slot 41 and the lever 40 is moved toward the stem 23, thereby carrying the platen 33 toward said stem and forcing the ticket z onto the type 25 which will print thereon the numeral 28, indicating that the load is 28,000 pounds. The ticket is then inserted in the slot 21 of the poise 19 and the lever 20 is operated, to impress on said ticket the number of pounds contained in the load over the even thousands. If it is necessary to weigh the load in two drafts, the weight of the second draft is impressed on the ticket z in the same manner as that of the first draft is impressed thereon and the two, when added together, will give the total weight of the load.

Referring now to my invention, which resides in printing on a ticket the identification of the scale simultaneously with the printing of the weight of the load, the numeral 44 indicates a character type in the form of the letter A. The type 44 is rigidly secured to the inner face of the head 26, adjacent to the passageway 28 and in a position to be brought into transverse alinement with any one of the numeral types 25. As best shown in Fig. 3, the face of the type 25 extends in the same vertical plane as that of the type 44. The platen 33 is provided with a lateral extension 45 which presses the ticket z onto the type 44 at the time the platen 33 presses said ticket onto the type 25. The companion scales will be identified by other letters of the alphabet. Any other suitable means may, of course, be used for identifying the scales.

It will be understood that, instead of placing the character identifying the scale on the head 26, it may be attached to the poise 19 so that, when the ticket z is inserted in the slot 21, the character may be printed thereon. Or, if desired, a character identifying the scale may be placed on both the poise and the head 26.

From the above description, it is evident that my scale identifying means may be applied to standard scales at an extremely small cost.

What I claim is:—

1. The combination with a scale beam having a counterpoise stem graduated to indicate pounds and provided with numerals of corresponding denominations, of a traveling indicator head mounted on said counterpoise stem and having a character identifying the scale, and a platen, carried by said traveling indicator head and coöperating with said numerals and character, for simultaneously impressing on a ticket the weight of a load on said scale and the character identifying said scale.

2. The combination with a scale beam having a counterpoise stem graduated to indicate pounds and provided with type numerals of corresponding denominations, of a traveling indicator head mounted on said counterpoise stem and having a type character identifying the scale, a movable platen, mounted on said traveling indicator head and coöperating with said type numerals and character, for simultaneously impressing on a ticket the weight of a load on said scale and the character identifying said scale.

In testimony whereof I affix my signature in presence of two witnesses.

WALTER A. CRAGIN.

Witnesses:
EMILY MAY KING,
HARRY D. KILGORE.

Copies of this patent may be obtained for five cents each, by addressing the "Commissioner of Patents, Washington, D. C."